United States Patent [19]

Viaud

[11] 4,393,764
[45] Jul. 19, 1983

[54] ROUND BALER WITH A DISCHARGE GATE FOR REARWARDLY MOVING A BALE

[75] Inventor: Jean Viaud, Gray, France

[73] Assignee: Deere & Company, Moline, Ill.

[21] Appl. No.: 294,651

[22] Filed: Aug. 20, 1981

[30] Foreign Application Priority Data

Aug. 20, 1980 [FR] France ............................ 80 18200

[51] Int. Cl.³ ........................ B30B 5/06; A01D 39/00
[52] U.S. Cl. ........................................ 100/88; 56/341
[58] Field of Search ................ 100/88, 5, 7; 56/341, 56/342, 343; 414/502

[56] References Cited

U.S. PATENT DOCUMENTS

| | | | |
|---|---|---|---|
| 4,135,352 | 1/1979 | Swenson et al. | 56/341 |
| 4,206,587 | 1/1979 | Freimuth et al. | 56/341 |
| 4,208,862 | 5/1979 | Waldrop et al. | 56/341 |
| 4,218,866 | 3/1979 | Parrish | 56/341 |
| 4,242,857 | 1/1981 | Parrish et al. | 100/88 X |
| 4,296,596 | 10/1981 | Waldrop et al. | 56/341 |

Primary Examiner—Peter Feldman

[57] ABSTRACT

A baler is comprised of a plurality of reversibly driven belts or chains supported on a plurality of transverse rollers and defining an expendable bale-forming chamber. A bale discharge gate is provided for opening the chamber and discharging a bale therein onto the ground. The gate includes at least a portion of the belts or chains and a motor for driving the belts or chains in a direction opposite to that used for bale formation and is further operable to bring a portion of the belts or chains into contact with a discharged bale and to displace the bale rearwardly from the baler along the ground.

6 Claims, 7 Drawing Figures

4,393,764

ROUND BALER WITH A DISCHARGE GATE FOR REARWARDLY MOVING A BALE

BACKGROUND OF THE INVENTION

The present invention concerns a baler (commonly known as "round" baler) for forming cylindrical bales.

The baler is of a well-known general type and comprises a plurality of rollers, sets of bands or belts supported on the rollers and defining a bale-forming chamber. A cylindrical bale is formed in the chamber by driving the belts to impart a rolling action to an incoming crop (e.g., forage and hay) as the baler is driven through a crop-containing field. When the bale attains the desired diameter and has been bound, the rear gate of the baler which is stopped, is opened and the bale is discharged onto the ground. The formation of another bale by rolling up can then be commenced inside the press.

Some of the belt supporting rollers are carried by pivotally mounted tensioning arms or equivalent members in such a manner that the path or movement of the belts is modified during bale formation so as to enlarge the bale-forming chamber to acommodate the increasing bale diameter.

In one commercially available round baler, the bale is deposited on the ground behind the bale-forming chamber after the opening of the rear gate. The rear gate of the baler is mounted for pivotal movement about a transverse horizontal axis located towards the upper part thereof. Following bale ejection, it is necessary to move the baler forward before the rear gate can be closed. The forward movement cannot take place simultaneously with the picking up of the crop on the ground since the chamber of the baler is then open. Consequently, it is necessary to move the machine backwards for the discharge of the bale and then, the gate being open, to return it to the beginning of the swath. It is thus possible to close the gate without hitting the bale and to pick up the crop again at the beginning of the swath. Otherwise, there would be a resulting loss of the crop remaining on the ground each time a completely formed bale is ejected.

Certain solutions to this problem have been proposed. In U.S. Pat. No. 4,206,587, a round baler with a resiliently mounted transverse bar for rearwardly propelling a bale as it is discharged from the chamber of the baler is disclosed. With the action of the resiliently mounted bar, the bale is propelled with sufficient force that it will roll rearwardly of the baler a sufficient distance so that the discharge gate of the baler may be closed without moving the baler forwardly. Also, in U.S. Pat. Nos. 4,208,862 and 4,218,866, a round baler with a bale-forming chamber defined by a plurality of reversibly driven chains is disclosed. The chains are driven in a first direction during the bale-forming operation and then are automatically reversibly driven during the bale discharge operation to impart a rearwardly directed top spin to the bale as it is discharged from the bale-forming chamber. The top spin imposed on the bale as it is discharged carries the bale away from the baler a sufficient distance so that the baler does not have to be driven forwardly to permit the closing of the discharge gate. Both of these approaches present certain inherent disadvantages. Both approaches operate on the basis of providing a rearwardly directed top spin to the bale as it is discharged from the bale-forming chamber. Because the bales may weigh between 900 and 1000 kg the uncontrolled rearward motion of the bale could be dangerous to anyone in the vicinity of the baler. In addition, if the baling operation is taking place in a hilly area, the bale may roll down a hill which could be dangerous and could position the bale in a location from which it would be difficult to retrieve. Furthermore, because, with varying crop conditions, the weight of the bale may vary from one bale to the next during the baling operation, the amount of energy imparted to the bales may need to be varied from one bale to the next. With both the foregoing designs, such variation is not possible.

Accordingly, it is an object of this invention to provide an improved baler which overcomes the inconvenience of rearward and forward movement of the baler during a bale discharge operation.

Another object of the invention is to provide a baler with a bale discharge gate which provides a controlled rearward rolling action to the bale.

Another object of this invention is to provide a baler with a bale-forming chamber defined by a plurality of reversibly driven bale-forming members, such as belts, for driving in a first direction during the formation of the bale and for driving in a second direction responsive to the discharge of the bale to roll the bale away from the baler.

SUMMARY OF THE INVENTION

These and other objects of the invention which will be apparent from a consideration of the foregoing description and accompanying claims are accomplished with a baler (1) having a bale-forming chamber defined by a plurality of members, such as belts or chains, supported on a plurality of transverse rollers and (2) having a bale discharge gate means for opening the chamber and discharging a bale on the ground. The gate means further includes bale drive means for contacting the discharged bale and for displacing the bale along the ground away from the baler.

Following the discharge of the bale on the ground, bale drive means causes the bale to roll along the ground so that the bale is moved away from the baler a sufficient distance to permit the gate means to be closed. The gate means can thus be closed without having to move the baler forwardly for closing of the chamber. Also, it is unnecessary to move the baler backwards for picking up the crop from the beginning of the swath because the baler remains stationary between the discharge of the completed bale and the commencement of the formation of another bale. Still further, because the bale drive means is in contact with the bale resting on the ground throughout its rearward displacement, a positive controlled driving action is imparted to the bale. The bale is moved in a controlled manner only a sufficient distance to permit the closing of the gate means. The controlled rolling action of the bale in accordance with this invention thus overcomes the safety hazard associated with the uncontrolled rolling action imparted to a bale in accordance with certain prior art designs discussed above.

The invention is preferably embodied in balers utilizing either one or two sets of belts to define the bale-forming chamber. According to an embodiment of this invention utilizing two sets of belts to define the chamber, the bale drive means includes the set of belts which defines the rear portion of the bale-forming chamber. The bale drive means is operable to maintain the belts in contact with the bale after the bale is discharged on the ground and imparts a rolling action to the bale for moving it rearwardly from the baler. The rear set of belts pass over guiding and tensioning rollers. At least one of rollers is displaceable in proportion to the increase in diameter of a bale during formation to accommodate the dimensional variation of the bale being formed in the chamber. One upper guide roller is mounted on a supporting arm and means are provided for displacing the supporting arm when the gate means is swung open for discharging the bale such that the belts are in contact with the bale and roll the bale rearwardly along the ground.

It will be recognized that when the bale is discharged on the ground the span of belts in contact with the upper part of the bale must move rearwardly. In prior art balers, the rolling action on the bale is effected in a direction which correspond to an upward movement of the run of belts at the rear of the bale-forming chamber when the discharge gate is closed. That direction is opposite to that which is required to roll the bale rearwardly following discharge. Therefore, in accordance with this invention, the rear set of belts is reversibly driveable. A belt drive means is provided for driving the belts in a first direction such that the span thereof which defines the rear of the chamber is displaced upwardly. The bale drive means includes motor means for driving such span in a second direction opposite the first when the chamber is opened. Clutch means is provided for disengaging the belt drive means for permitting the belts to be driven in the second direction. The motor means may be constituted by a hydraulic motor for driving the span in the second direction.

In accordance with a variation, the belt drive means may be reversibly driven simply by way of a clutch for disengaging the drive in the first direction and insertion of a reversing gear into the drive train for driving in the opposite direction.

In accordance with still another variation, the belts defining the bale-forming chamber may be driven by a belt drive means for driving the belts in the same direction during bale formation and during displacement of a bale along the ground away from the baler following discharge. According to this variation, the belts are similarly maintained in contact with the bale following discharge on the ground to impart automatically a rolling action to the bale in the rearward direction.

In accordance with an embodiment of this invention utilizing one set of belts to define the chamber, a baler is comprised of a plurality of transverse rolls and a plurality of belts which define a bale-forming chamber and a discharge gate means for opening the chamber and discharging a bale on the ground. Gate means further includes a bale drive means for contacting a bale discharged on the ground and for displacing the bale along the ground away from the baler. A belt drive means is provided for driving the belts in a first direction during bale formation and is disengageable through a clutch for bale discharge. The bale drive means includes a motor means for driving the belts in a second direction opposite to the first direction when the chamber is opened and when the belt drive means is disengaged through the clutch.

DETAILED DESCRIPTION OF THE PREFERRED EMBODIMENTS

Figure 1:
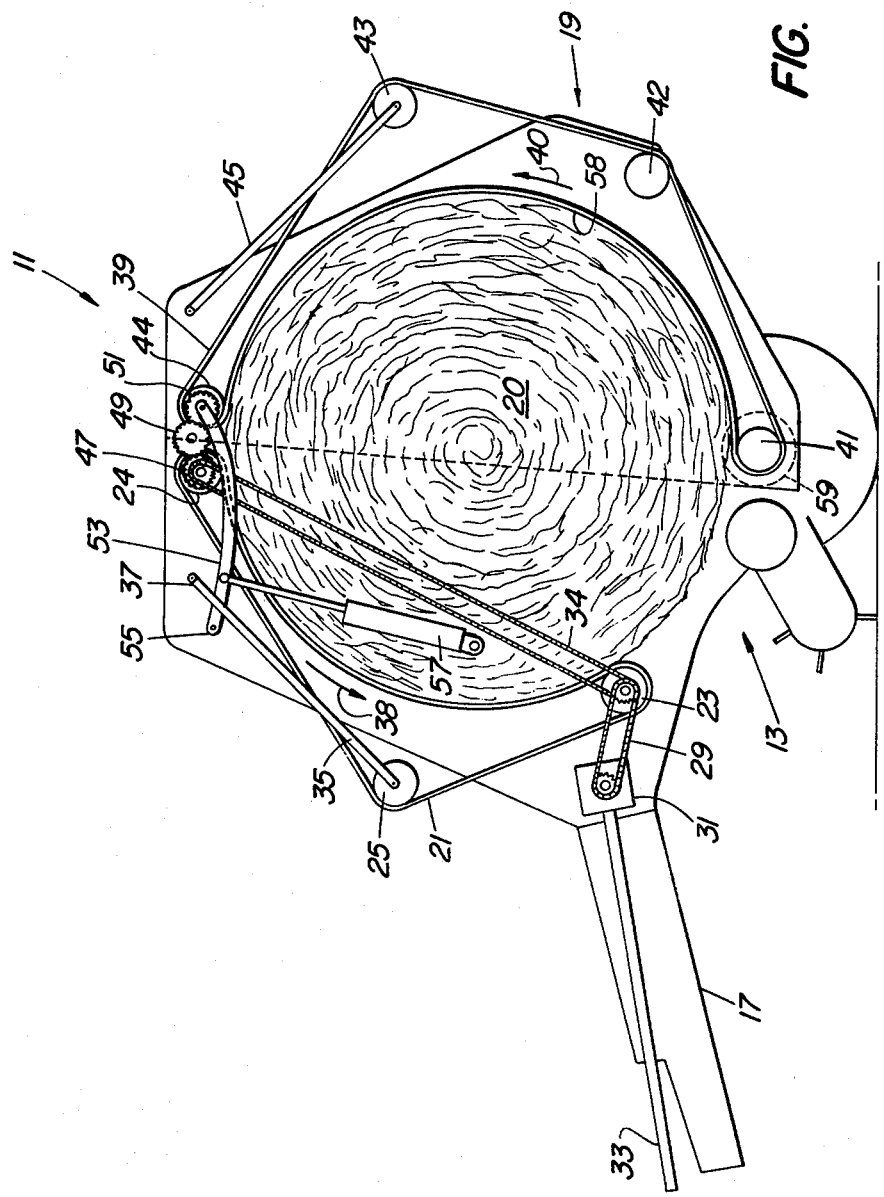
FIG. 1 is a schematic longitudinal, vertical cross-sectional view of a round baler in accordance with the features of this invention. The baler is shown with a completed bale in the bale-forming chamber.
Figure 2:
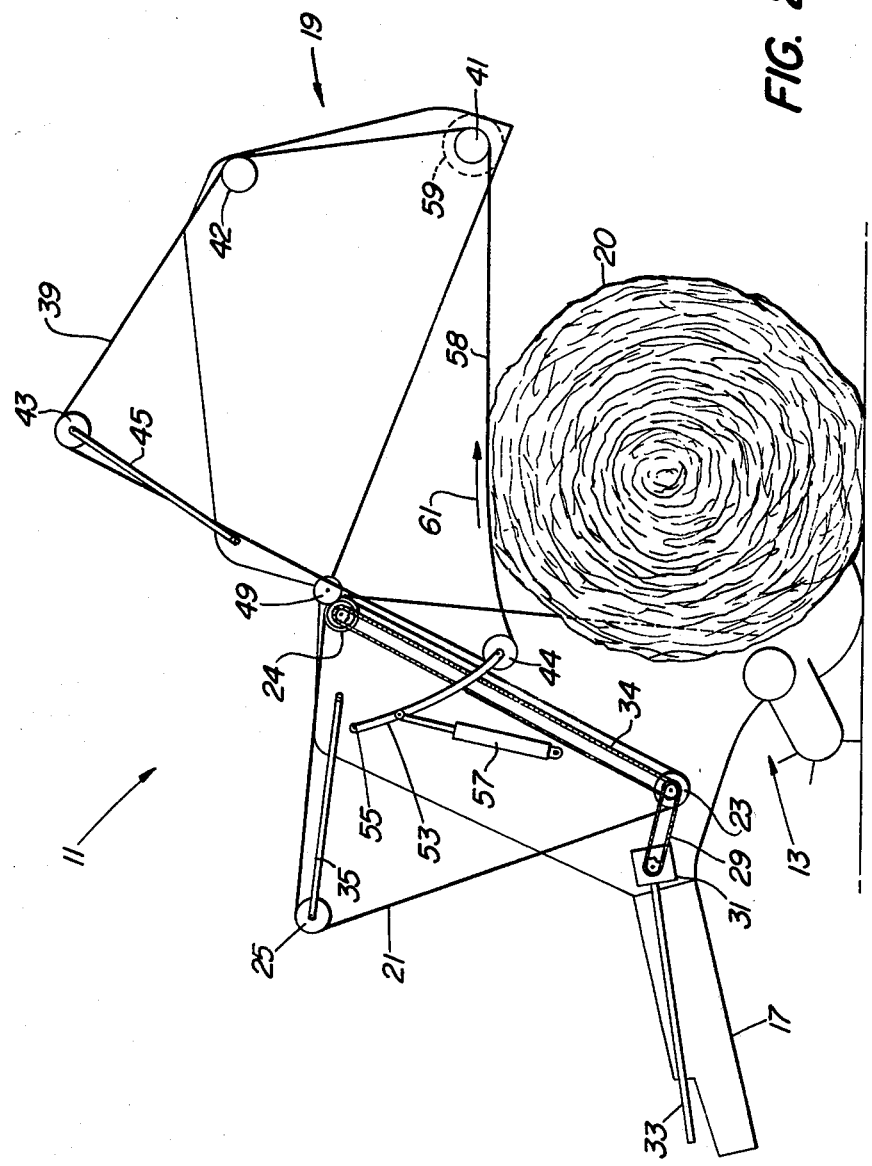
FIG. 2 is a schematic view of the baler shown in FIG. 1 showing the condition of the baler upon discharge of the completed bale onto the ground.

In accordance with a first embodiment shown in FIGS. 1 and 2, a round baler 11 comprises a fixed front frame 13 supported by wheels (only one shown) and carrying a towbar 17 for connecting baler 11 to a tractor. On frame 13 forming the chassis, a bale discharge gate means 19 is pivotally mounted about an upper transverse horizontal axis (not shown).

A bale-forming chamber 20 is defined, in part, by a first set of belts 21 supported on a plurality of transverse rollers 23, 24, 25 rotatably supported in frame 13. Belts 21 are supported in a plurality of spaced vertical planes distributed over the width of the baler. Rollers 23, 24 are rotatably mounted in fixed positions in frame 13. Roller 23 is driven by belt or chain drive 29 from a gear box 31. Gear box 31 is driven by a transmission shaft 33 connected to the power take-off shaft of the tractor. Another belt or chain drive 34 transmits the drive from roller 23 to roller 24. Roller 25 is mounted on a pair of tensioning arms 35 (only one shown) pivoted at 37 on frame 13. Arms 35 are biased in a clockwise direction (FIG. 1) in a conventional manner and are adjustable in a counterclockwise direction during the bale-forming operation to permit enlargement of the bale-forming chamber with the increasing diameter of a bale during formation.

Chamber 20 is further defined by a second rear set of belts 39 which are supported on fixed rollers 41, 42 and on movably mounted rollers 43, 44. Roller 43 is mounted on a pair of tensioning arms 45 (only one shown) pivotally mounted at 46. Arms 45 are biased in a counterclockwise direction in a conventional manner to maintain belts 39 under tension and are adjustable in a clockwise direction during bale formation to permit enlargement of the bale-forming chamber to accommodate the increasing bale diameter during bale formation. Arms 35 and arms 45 may be biased in the aforesaid conventional manner through the use of hydraulic cylinders of spring (not shown).

Upper roller 44 is rotatably driven through interconnection via a disengageable gear train of a gear 47 fixed to roll 24, an idler gear 49 and a gear 51 fixed to upper roll 43. During bale formation, belt sets 21, 39 travel in the direction indicated by the arrows 38, 40 in FIG. 1.

Upper roller 44 is rotatably mounted on the end of an arm 53 which is pivotally mounted at 55 on frame 13. Arm 53 is movable about pivot 55 by the action of a hydraulic cylinder 57. Cylinder 57 is operated in conjunction with the hydraulic cylinders (not shown) for opening and closing gate means 19 so that arm 53 is pivoted clockwise when gate means 19 is raised as shown in FIG. 2.

In accordance with a feature of this invention, when gate means 19 is opened and the bale is discharged, the pivotal movement of arms 53 maintain a span 58 of belts 39 in contact with the bale resting on the ground following discharge. As may be seen in FIG. 1, span 58 forms the rear portion of the bale-forming chamber 20.

In accordance with another feature of this invention, a hydraulic motor 59 is drivingly coupled with roller 41 for rotation of belt set 39 in a counterclockwise direction (FIG. 2) to provide rearward movement of the discharged bale. The belt set 39 and motor 59 thus constitute a bale drive means for rearward movement of a bale following discharge. When gate means 19 is opened and arms 53 are pivoted clockwise, gear 51 carried by roller 44 are disengaged from idler gear 49 so that belts 39 are no longer driven. Arms 53, gears 47, 51 thus constitute a clutch for engaging and disengaging the drive train for belt set 39. When gate means 19 is opened, hydraulic motor 59 is fed with hydraulic fluid and roller 41 is driven in a direction to displace belts 39 in a direction opposite to that used for forming a bale as indicated by the arrow 61 in FIG. 2. It can be seen that the displacement of belts 39 in a counterclockwise direction with span 58 in contact with the upper part of the bale resting on the ground causes the bale to roll in a controlled manner to produce rearward movement away from baler 11. The bale is drivable in this manner to a position where gate means 19 may be closed without hitting the bale and without having to move baler 11 forward. Once gate means 19 is shut, the beginning of a formation of a new bale by picking up crop from a swath can be initiated immediately without the need to relocate the baler adjacent to the end of the swath as was necessary with certain prior art designs.

In summary, it can be seen that gate means comprised by belt set 39, rollers 41–44, support arms 45, 53 cylinder 57, and motor 59 is operable (1) to open chamber 20 (2) to discharge a completed bale (3) to contact the discharge bale resting on the ground and (4) to roll the bale rearwardly of the baler in a controlled manner.

Figure 3:
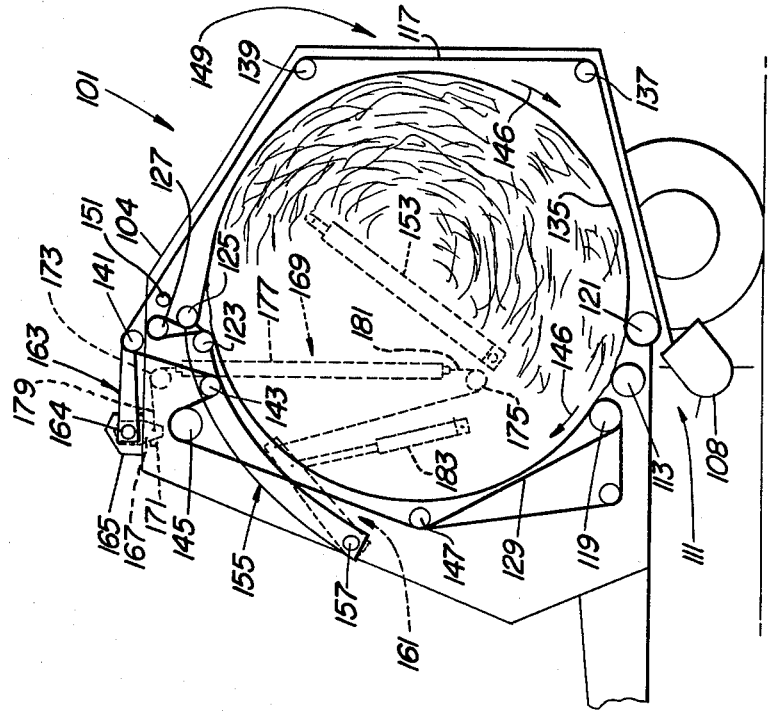
FIG. 3 is a schematic longitudinal, vertical cross-sectional view of a baler in accordance with a second embodiment of this invention. The baler is shown with the bale chamber empty.
Figure 4:
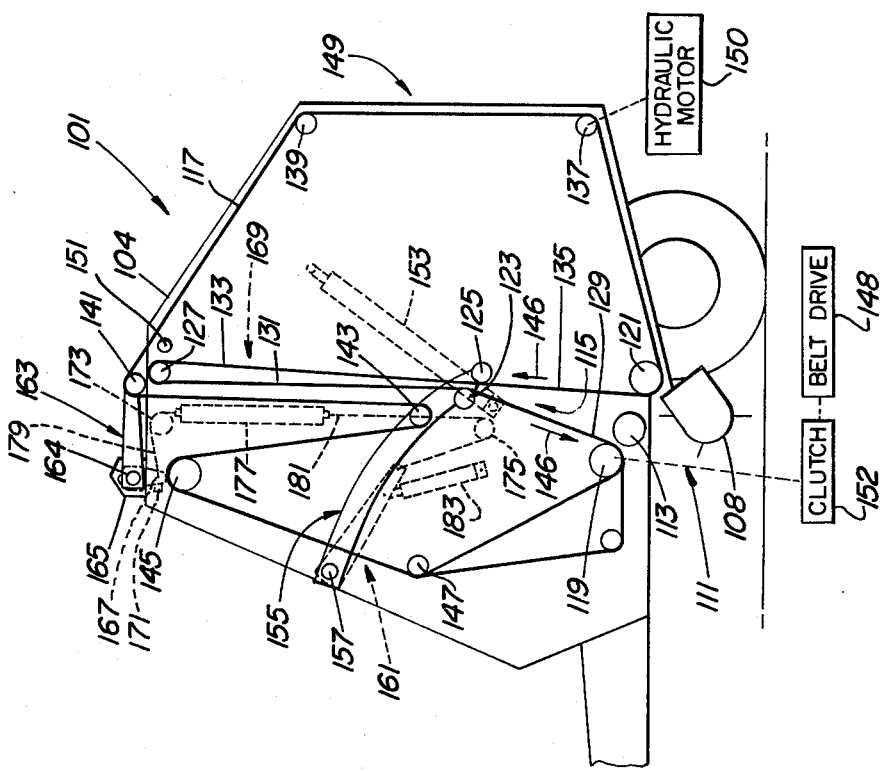
FIG. 4 is a schematic view of the baler shown in FIG. 3 with a completed bale in the bale-forming chamber.

Reference is now made to FIGS. 3 through 6 which show a baler 101 in accordance with a second embodiment of this invention. Baler 101 includes a draft tongue (not shown) for connection to a tractor (not shown) by means of which the machine is caused to advance over a field of previously harvested crops. The main frame of baler 101 has opposite fore-and-aft, vertical, spaced side walls 104, one of which is not shown to expose interior components. A typical crop pick-up 108 feeds ground-borne crops upwardly to a crop inlet 111, assisted by a transverse roller 113, into a bale-forming chamber 115 that increases in diameter as the bale is formed. FIG. 4 shows the fully expanded chamber 115. The bale-forming chamber 115 is defined by a plurality of transverse rolls and a plurality of endless belts 117 trained thereabout. Part of this system includes a lower front roll 119, a lower rear roll 121, an intermediate front roll 123, an intermediate rear roll 125 and an upper roll 127. A belt stretch 129 extends from the roll 119 to the roll 123 and continues at 131 to the upper roll 127, returning then downwardly at 133 to a web or stretch 135 to the lower rear roll 121. As will appear subsequently, the stretches 129 and 135 define an initial bale-forming chamber 115 that increases in diameter as the crop is rolled into a bale of increasing size until a predetermined size is attained.

Belts 117 extend downwardly from the lower rear roll 121 to a rearward lower roll 137, then upwardly to a roll 139, upwardly and forwardly to a roll 141, down to a third intermediate roll 143, back up to a high roll 145, down to a forward roll 147 and back to the lower front roll 119. Belts 117 are drivable for bale formation in the direction of arrows 146 by conventional drive means 148 powered by the tractor power take-off. A clutch 152 is interconnected between drive 148 and driven roller 119 for selectively disengaging the drive to belts 117. Clutch 152 may be of a conventional design such as a belt idler, jaw, or friction disc type remotely actuable from the operator's station in the tractor cab.

Figure 5:
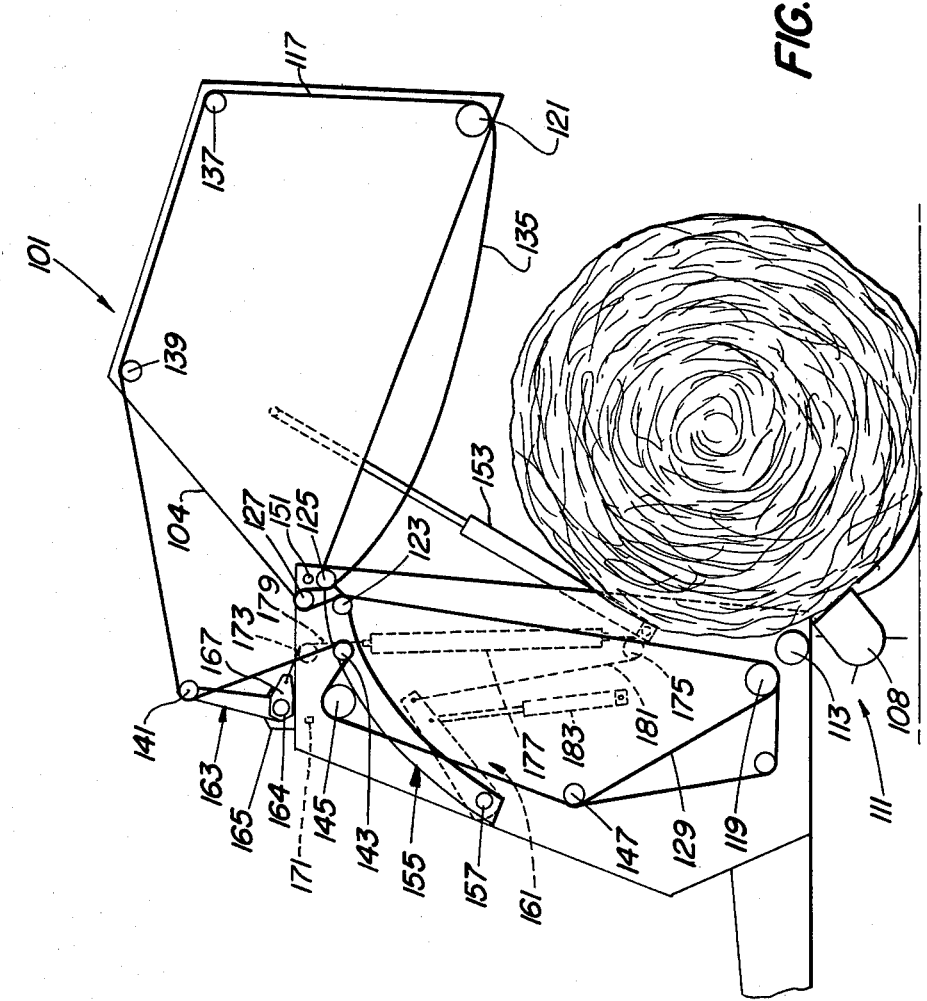
FIG. 5 is a schematic view of the baler shown in FIG. 3 illustrating the discharge of the completed bale from the bale-forming chamber onto the ground.

A gate means 149 which includes rolls 121, 137, 139 and the rear halves of sidewalls 104 is pivoted on the respective front halves of sidewalls by a suitable pivot means 151. When the bale is completed (FIG. 4), the gate means 149 is swung upwardly and rearwardly by a pair of hydraulic cylinders 153 (only one shown) to a discharge position (as shown in FIG. 5) to enable rearward discharge of the completed bales onto the ground. Hydraulic cylinders 153 are mounted on each side wall of the machine and connected hydraulically to the hydraulic system (not shown) of the towing tractor (also not shown).

Figure 6:
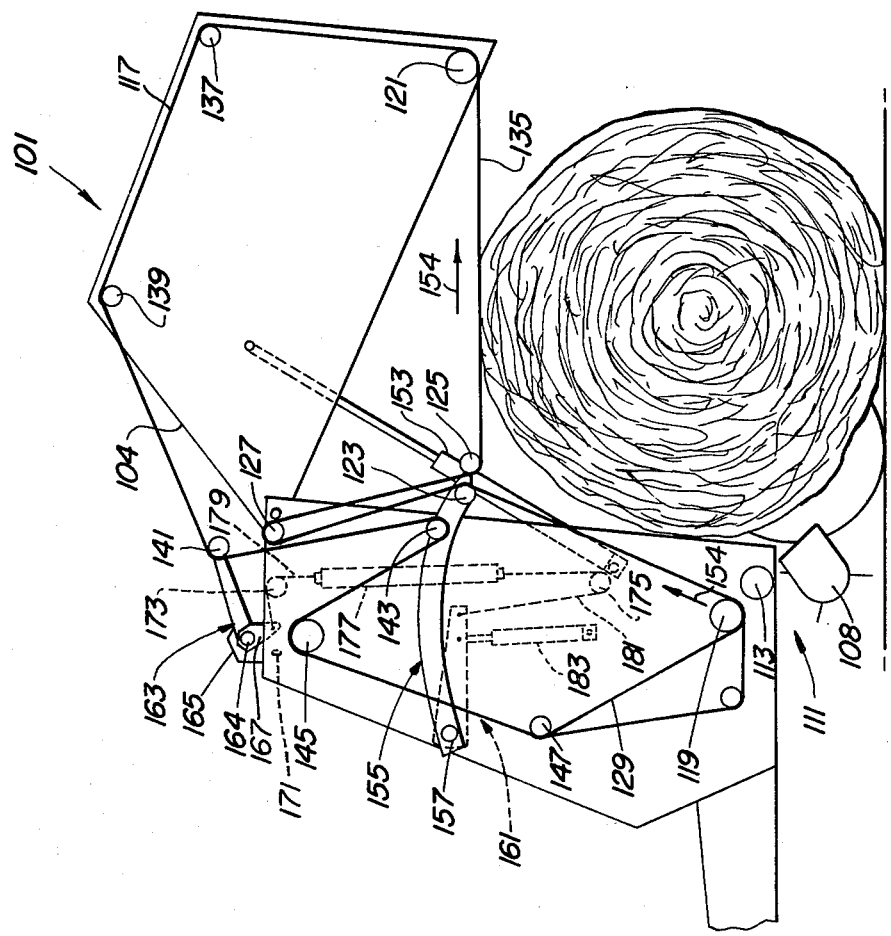
FIG. 6 is a schematic view of the baler of FIG. 3 illustrating the rearward displacement of a bale following discharge from the bale-forming chamber.

In accordance with a feature of this invention and as shown in FIG. 6, gate means further includes a bale drive means for contacting the discharged bale and for displacing said bale along the ground away from the baler. Bale drive means includes belt spans 129, 135 and a hydraulic motor 150 for driving the spans 129, 135 in the direction of arrows 154 (FIG. 6) opposite to the direction 146 which belts 117 move during bale formation. For simplicity, motor 150 may be connected into an independent hydraulic circuit on baler 101 and is remotely, manually actuable from the tractor cab following bale discharge onto the ground and disengagement of drive 148 via clutch 152.

A belt tensioning system 155 is comprised of the three rolls 123, 125, 143 which are journalled on a carrier 155, here comprising a generally fore-and-aft arm just inwardly of each side wall 104 and secured in common to a transverse pivot shaft 157 rockably carried by the respective side walls 104. A lever arm means 161 is fixed to each end of the cross shaft 157 just outwardly of each side wall 104 (FIG. 3 shows one such arm) and extends rearwardly. The top roll 141 is journaled on a pair of interior lever arms 163 (only one shown) that are fixed to an upper rockshaft 164 pivoted near opposite ends at 165 on side walls 104. At each side of the machine, an outer lever arm means 167 is affixed to the near end of the rockshaft 164 outwardly of the respective side walls 104. A cable and sheave arrangement 169 interconnects the rockshaft lever arm 167 and the carrier arm 161 at each side of the machine. A stop 171 is provided for each rockshaft lever arm 167.

A chain and sprocket arrangement 169 comprises an upper sheave 173, a lower sprocket 175, a coiled tension spring 177, an upper chain 179 connected to the rockshaft lever arm 167 and trained about the upper sprocket 173 and then connected to the upper end of the spring 177, and a lower chain 181 connected to the lower end of the spring 177, trained about the lower sprocket 175 and then connected to the free end of the carrier lever arm 161. The means 169 comprises part of a control means for controlling the position of the rolls 123, 135, 143 as the bale increases in size. Rolls 123 and 125, together with their associated stretches of belt serve to confine the upper part of the bale, yielding together or as a unit to accommodate the increasing size of the bale during formation.

A further part of the control means, includes at each side of the machine, a hydraulic cylinder and piston unit 183 together with its hydraulic connections to the hydraulic system (not shown) for example, of the towing tractor. This will be described in connection with FIG. 7.

Figure 7:
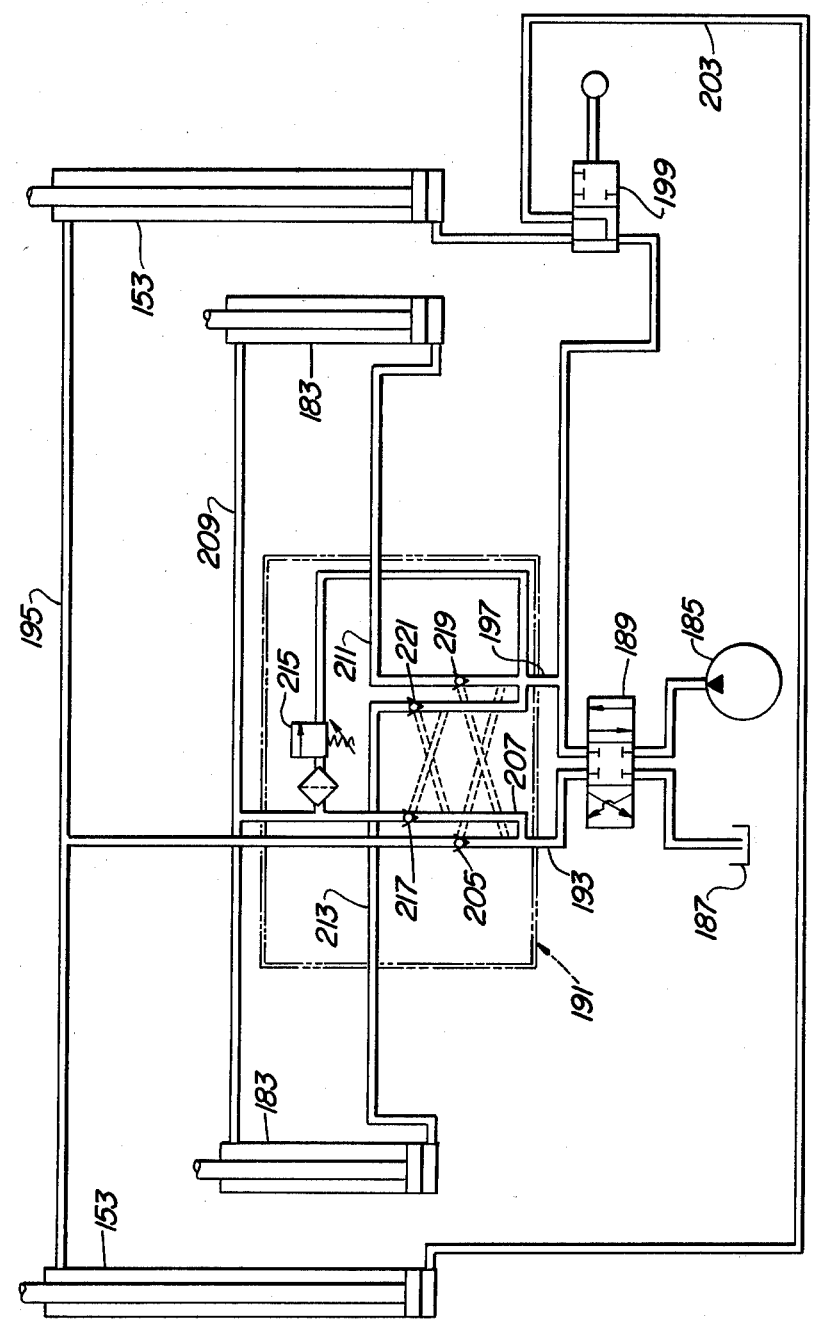
FIG. 7 is a circuit diagram of a hydraulic circuit of the baler of FIG. 3.

A typical basic system such as those conventionally associated with agricultural tractors is shown in FIG. 7 as including a pump 185, reservoir 187 and main control valve 189. As also seen in FIG. 7, the cylinders 153 and 183 are connected in parallel through the intermediary of an intervening valve control means 191. Operation of the gate means cylinders 153 will be considered first. A line 193 leads from the control valve 189 to the upper ends of the cylinders 153 via branches 195. Pressurizing of these lines retracts the cylinders 153. Another line 197 leads from the control valve 189 to the lower ends of the cylinders 153 via a cut-off valve 199 (open in FIG. 7) and branches 201 and 203 to the lower ends of the cylinders 153 for extending the cylinders to open the gate (FIG. 5). When the cut-off valve 199 is closed, the gate cylinders will not extend or retract. A pilot-operated check valve 205 is provided in the line 195 to prevent leakage back through the control valve 189 when the gate means is closed. The dotted lines represent the pilot operation.

Operation of the control means cylinders 183 will now be covered. A line 207 leads off from the line 195 to the upper ends of the cylinders 183 via branches 209, and the line 197 leads to the lower ends of the cylinders 183 by means of branches 211 and 213. Adjustable relief valve means 215 (closed in FIG. 6) cross connects the lines 207 and 197. These lines respectively include check valve 217 to preclude leakage back through control valve 189, the dotted lines representing pilot operation of the check valve. Pilot-operated check valves 219, 221 are provided to prevent retracting of the cylinders 183 unless the pump 185 is operating and the valve 189 is actuated. This system provides a separate line and check valve for each cylinder, which means that at least two components of the system must fail before both hydraulic cylinders can retract accidentally.

In the operation of baler 101, the ground-borne crop is picked up by pick-up 108 and fed into an inlet 115. The belt travels in the direction of arrows 146 through a drive imparted by drive means 148 through clutch 152 to driven roll 119. As more and more crop is fed into chamber 115, the bale increases in size and carrier with rolls 123, 125, 143 move counterclockwise about pivot 157 under the control of chain, sprocket and spring system 169 and cylinder 183. Upon completion of the bale, gate means 149 is operated to discharge the bale onto the ground as shown in FIG. 6. The operator then disengages belt drive through clutch 152. Gate means 149 is then lowered along with carrier 155 until span 135 engages the top of the discharged bale resting on the ground, as shown in FIG. 6. Hydraulic motor 150 is then activated to drive the bale rearwardly in a controlled manner beyond the rear extent of gate means 149. Following the rearward movement of the bale, gate means 149 may then be closed, permitting the immediate movement forward of the baler into the swath to begin the formation of another bale.

While the invention has been described in accordance with certain preferred embodiments thereof, it will be recognized by those skilled in the art that other variations and modifications of these may be practiced in accordance with the features of this invention. Accordingly, it is intended that all such variations and modifications are comprehended by the appended claims.

I claim:

1. In a round baler comprising:
a plurality of transverse rollers;
means supported on said rollers and defining a bale forming chamber for forming a bale of generally cylindrical shape; and
a bale discharge gate means for opening said chamber and discharging said bale on the ground; the improvement comprising:
said gate means further comprising bale drive means for contacting a bale discharged on the ground and for displacing said bale along the ground away from said baler.

2. The baler of claim 1 wherein said bale drive means comprise a span of said chamber defining means.

3. The baler of claim 1 wherein said chamber defining means is a front set of belts and a rear set of belts carried by said gate means, said bale drive means includes (1) said rear set of belts supported on one of said rollers, (2) a supporting arm mounting said one roller and (3) means for displacing said arm responsive to the opening of said chamber to maintain said rear set of belts in contact with a bale discharged on the ground.

4. The baler of claim 3 wherein said gate means includes a hydraulic cylinder connected to said arm for displacing said arm and said one roller when said chamber is opened.

5. The baler of claims 1, 3 or 4 further comprising means for driving said chamber defining means in a first direction such that a span thereof which defines the rear of said chamber is displaced upwardly and wherein said bale drive means includes means for driving said span in a second direction opposite to said first direction when said chamber is opened.

6. The baler of claim 5 further comprising clutch means are provided for disengaging said means for driving said chamber defining means and wherein said bale drive means includes a hydraulic motor for driving said span in said second direction.

* * * * *